Oct. 3, 1967
G. BERGSON
3,344,852
GAS DRYING APPARATUS
Filed June 15, 1964
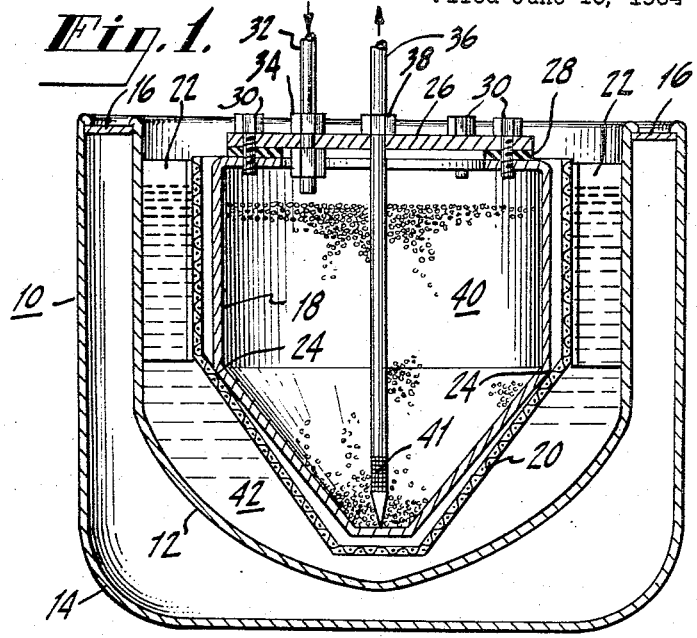
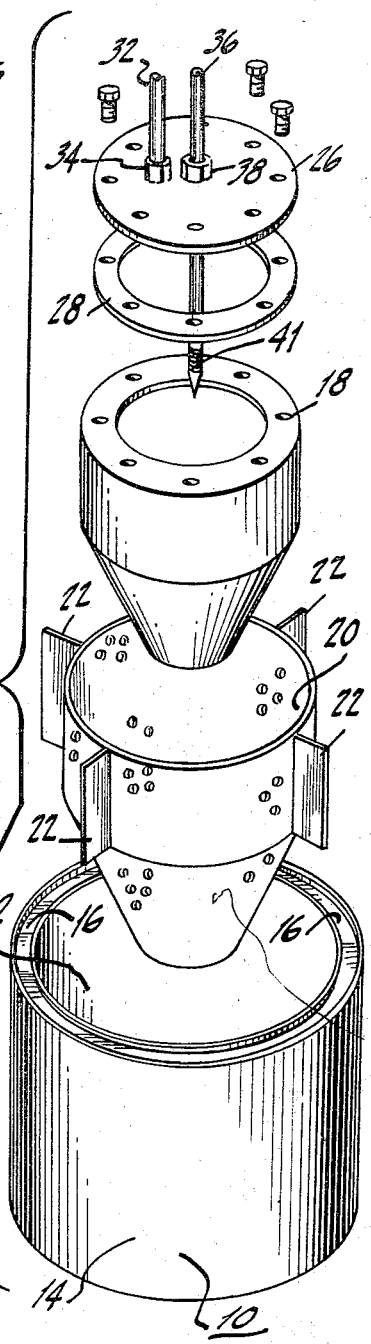
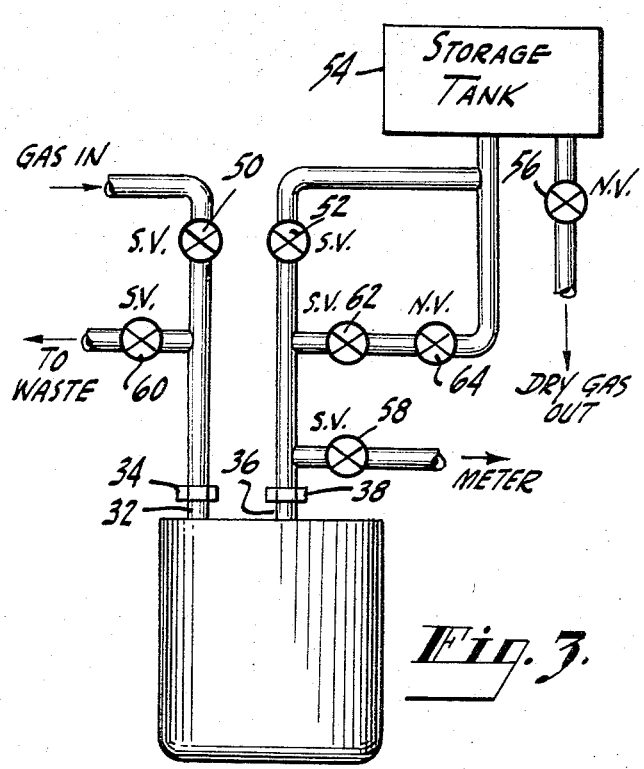
INVENTOR.
GUSTAV BERGSON
BY Eugene M. Whitacre
Attorney United States Patent Office 3,344,852
Patented Oct. 3, 1967

3,344,852
GAS DRYING APPARATUS
Gustav Bergson, Apt. 319, Benson Apartments,
Jenkintown, Pa. 19046
Filed June 15, 1964, Ser. No. 375,238
2 Claims. (Cl. 165—71)

This invention relates to gas drying apparatus, and more particularly to an apparatus and system for removing moisture from a gas stream to concentrations of the order of one part of water vapor per million parts of gas.

Apparatus embodying the invention comprises a generally conically shaped container for a granular material which is chemically and physically inert with respect to the gas to be dried. Preferably the granular material comprises a great number of very small diameter glass balls, or a mixture of such glass balls with small diameter stainless steel balls.

The surface of this container is maintained at a temperature below the desired dew point of the gas to be dried. This gas is admitted to the container near the top thereof and is taken from the container near the apex which extends downwardly. As the gas passes through the interstices between the balls, the latent heat of vaporization of the water vapor is given up and the water vapor condenses. As the gas continues down through the spaces between the balls, the smaller diameter of the conically shaped container provides an increasingly more efficient heat transfer between the gas and the refrigeration system. This is of particular significance in view of the fact that the gas approaching the apex of the container has lost much of its initial water vapor and the improved heat transfer insures increasingly lower temperature as gas progresses downwardly with consequent efficient removal of substantially all of the remaining moisture removed prior to the time that the gas leaves the chamber.

The apparatus described provides extremely efficient water vapor removal for relatively high rates of gas flow. In addition the apparatus has a relatively high capacity in that the drying operation can be continued over an extended period of time before a backflushing procedure is required to remove accumulated water in the container.

In accordance with a feature of the invention a novel backflushing system is provided wherein dried gas in excess of that required by the primary process for which the apparatus is used is flushed back through the container.

The novel features which are considered to be characteristic of this invention are set forth in the appended claims. The invention itself, however, both as to its organization and method of operation together with additional objects and advantages thereof will best be understood from the following description when read in connection with the accompanying drawings in which:

FIGURE 1 is a sectional view of a gas drying apparatus embodying the invention;

FIGURE 2 is an exploded perspective view of the gas drying apparatus of FIGURE 1; and FIGURE 3 is a flow diagram of a backflushing system for a gas drying apparatus embodying the invention.

The gas drying apparatus shown in FIGURES 1 and 2 includes a DeWar temperature insulating vessel 10 having inner and outer walls 12 and 14 joined by a gasket 16. The space between the walls 12 and 14 is filled with a suitable insulating material.

A generally conically shaped container 18 is positioned in the vessel 10, and maintained in spaced relation to the inner wall 12 by a perforated centering member 20. The member 20 includes a plurality of fins 22 for engaging the inner wall 12, and is shaped to engage the container 18 at point 24 as shown in FIGURE 1.

A cover 26 and gasket 28 are secured to the top of the container by bolts 30. The cover 26 includes a gas inlet tube 32 having a suitable fitting 34 for connection to a source of gas to be dried. The gas inlet tube communicates with the upper portion of the interior of the container 18. A gas outlet tube 36 having a suitable fitting 38 for connection to a process which uses the dry gas, extends to the bottom of the container 18 near the apex thereof.

The container 18 is substantially filled with a granular material 40 which may comprise small diameter glass balls. In practice, glass balls 0.010 inch in diameter were found to provide excellent results. However, other materials chemically and physically inert to the gas being dried may also be used. For example, a mixture of 0.010 inch diameter glass balls and 0.125 inch diameter stainless steel balls also proved to provide excellent results. With the latter mixture, the stainless steel balls improved the thermal conductivity of the volume of material in the container 18. It will be noted that the gas outlet pipe 36 includes a screen 41 of sufficiently small mesh to pass the gas, but not the glass balls 40.

The space between the container 18 and the inner wall 12 includes a suitable refrigerant 42 to maintain the container 18 at a temperature below the desired dew point. In the present embodiment of the invention the refrigerant may comprise a mixture of Dry Ice and methyl alcohol. Such a mixture maintains the container 18 at a temperature below minus 100° F. It is to be understood however that a mechanical refrigeration system may be used if desired.

In operation, a gas to be dried is admitted through the gas inlet pipe 32 to the upper portion of the inside of container 18. The gas is forced under pressure downwardly through the interstices between the glass balls 40. The latent heat of vaporization of water vapor contained in the gas is given up due to the low temperature of the glass balls 40, and the water condenses. Generally, additional heat is released corresponding to the negative surface energy of the water on the balls. As the gas passes down through the spaces between the balls, more and more moisture is removed. However, due to the conical shape of the container 18 the thermal relation of the refrigerant 42 to the balls 40 insures a continuously decreasing temperature as required to continuously lower the dew point of the gas as it passes to the exit point 41.

It has been found that the apparatus described is capable of drying 100 standard cubic feet per hour having 100 parts of water vapor per million parts of gas to a dryness of less than 1 part of water vapor per million parts of gas. The system is suitable for use over extended periods of time before a backflushing operation is required to remove accumulated water from the container. In operation, where the gas flow rate was 40 standard cubic feet per hour it was found that a backflushing operation every 24 hours was sufficient. In this regard, the conical configuration of the container contributes materially to the capacity for holding congealed water without blocking the gas flow path. This is because the greater portion of the water condenses near the top of the container where the diameter, and hence the number of interstices between the glass balls is greater.

The type of drying apparatus described provides an advantage over a desiccant type of drying system in that the glass balls can be cleaned to contain substantially no impurities which might be picked up by the gas whereas in a desiccant system the gas may pick up particles of impurities which are too small for efficient filtering.

A novel and efficient backflushing system for the gas drying apparatus of FIGURES 1 and 2 is shown in the flow diagram of FIGURE 3. During the time when gas is being dried, gas from a suitable source, not shown, is admitted through a solenoid valve 50 to the inlet pipe of the gas drying apparatus in the vessel 10. The dried gas is taken from the outlet pipe 36 and passed through a solenoid valve 52 to a storage tank 54. From the storage tank 54 the gas is passed at a suitable rate determined by the setting of a needle valve 56 to the desired utilization process.

The outlet pipe 36 also communicates with a solenoid valve 58 which connects with a meter monitoring the moisture content of the dried gas, not shown. During the gas drying operation the solenoid valves 60 and 62 are closed and do not permit gas to pass therethrough.

Since the gas can be dried at a rate faster than required by the ultimate process, the excess gas is accumulated in the storage tank 54. After an extended period of use, when it is desired to backflush the container 18 to remove the accumulated water, the solenoid valves 50 and 52 are closed, the refrigerant is removed, the container is brought to room temperature or heated, and the solenoid valves 60 and 62 are opened. Dry gas under pressure in the tank 54 then passes at a rate of flow determined by the needle valve 64 in the reverse direction through the container 18, and out through the solenoid valve 60 to waste while continuing to maintain flow through needle valve 56. The dry gas from tank 54 is extremely effective in picking up and removing the water vapor from the container 18 at the raised temperature of the latter. Due to the amount of water vapor which can be held by the higher temperature dry gas passing through the container 18, the rate of its flow, determined by the needle valve 64 can be set to a very small fraction, of the order of less than one percent of that which prevails during forward operation while substantially all of the water accumulated in the container 18 can be removed in a matter of minutes.

The various solenoid valves may be automatically controlled by a suitable electrical switching system, not shown, to open and close the various valves in the sequence described above. However it is to be understood that other types of valves may be used.

Having described the invention, what is claimed is:
1. Gas drying apparatus comprising,
a substantially conically shaped container having an upper base portion and a lower apex portion,
a gas inlet opening communicating with the interior of said container near the upper portion thereof,
a gas outlet opening communicating with the interior of said container near the lower apex portion thereof, and
a granular material chemically and physically inert with respect to the gas being dried providing interstices for gas flow therebetween substantially filling said container,
said container adapted to be refrigerated to a temperature below the dew point of the gas to be dried,
a temperature insulating container enclosing said substantially conically shaped container, and
including a perforated centering member positioned in said temperature insulating container between said temperature insulating container and said conically shaped container for holding said conically shaped container substantially centered with said insulating container and permitting the free flow of liquid refrigerant through the perforations thereof.
2. Gas drying apparatus comprising,
a substantially conically shaped container having an upper base portion and a lower apex portion,
a gas inlet opening communicating with the interior of said container near the upper portion thereof,
a gas outlet opening communicating with the interior of said container near the lower apex portion thereof,
a granular material having individual substantially spherical grains chemically and physically inert with respect to the gas being dried substantially filling said container, and providing interstices for gas flow therebetween,
a first valve connected between said gas inlet opening and a source of gas to be dried,
a storage tank for dried gas,
second and third valves connected between said gas outlet opening and said storage tank,
a fourth valve connected to said gas inlet opening,
said first and second valves adapted to be opened and said third and fourth valves adapted to be closed during the time gas is being dried, and
said third and fourth valves adapted to be opened, and said first and second valves adapted to be closed for backflushing dried gas from said storage tank through said conically shaped container to remove accumulated water therein,
said conically shaped container adapted to be refrigerated to a temperature below the dew point to which gas is to be dried during the time gas drying operation, and
said conically shaped container adapted to be maintained above the freezing point of water during the time said container is being backflushed.

References Cited

UNITED STATES PATENTS

| | | | |
|---|---|---|---|
| 773,876 | 11/1904 | Lorillard | 55—58 X |
| 1,423,696 | 7/1922 | Stevens | 55—222 X |
| 1,661,104 | 2/1928 | Barnebey | 55—269 X |
| 1,714,245 | 5/1929 | Schaefer | 55—208 |
| 1,716,333 | 6/1929 | Vuilleumier | 165—185 X |
| 1,921,806 | 8/1933 | Carlson | 55—208 |
| 2,121,733 | 6/1938 | Cottrell | 165—4 X |
| 3,116,987 | 1/1964 | Honerkamp et al. | 55—31 |

REUBEN FRIEDMAN, *Primary Examiner.*

J. ADEE, *Assistant Examiner.*